United States Patent [19]
Hegedus et al.

[11] 3,723,514
[45] Mar. 27, 1973

[54] (-)THREO-3-(4-HYDROXY-3-METHOXYPHENYL)-SERINE

[76] Inventors: Balthasar Hegedus, 1 Im Marteli, Binningen; Paul Zeller, 52 Rosenbergweg, Allschwil, both of Switzerland

[22] Filed: Jan. 15, 1970

[21] Appl. No.: 3,195

[30] Foreign Application Priority Data

Feb. 7, 1969 Switzerland..........................1887/69

[52] U.S. Cl...................................260/519, 424/319
[51] Int. Cl...........................................C07c 101/32
[58] Field of Search........................................260/519

[56] References Cited

UNITED STATES PATENTS 3,440,279   4/1969   Sugimoto et al......................260/519

OTHER PUBLICATIONS

Texas Reports on Biology and Medicine, E. Beerstecher et al., Vol. 13, No. 2 (1955), pages 195 to 205 relied on.

Berichte, 52B (1919), K. W. Rosenmund et al., pages 1734 to 1749 relied on.

*Primary Examiner*—Lorraine A. Weinberger
*Assistant Examiner*—L. Arnold Thaxton
*Attorney*—Samuel L. Welt, Jon S. Saxe, Bernard S. Leon and William G. Isgro

[57]   ABSTRACT

A hypotensively active phenylserine derivative is described.

1 Claim, No Drawings

(−)-THREO-3-(4-HYDROXY-3-METHOXYPHENYL)-SERINE

BRIEF SUMMARY OF THE INVENTION

The invention relates to (−) threo-3-(4-hydroxy-3-methoxyphenyl)-serine prepared from racemic threo-3-(4-hydroxy-3-methoxyphenyl)-serine utilizing an optically active base or an optically active acid.

DETAILED DESCRIPTION OF THE INVENTION

The invention relates to the preparation of the laevorotatory form of threo-3-(4-hydroxy-3-methoxyphenyl)-serine, designated herein as (−) threo-3-(4-hydroxy-3-methoxyphenyl)-serine.

The process for the preparation of (−) threo-3-(4-hydroxy-3-methoxyphenyl)-serine comprises reacting a derivative of racemate threo-3-(4-hydroxy-3-methoxyphenyl)-serine with an optically active base or an optically active acid, and from the obtained mixture of the two optical antipodes the (−) threo derivative is separated and from this the desired (−) threo-3-(4-hydroxy-3-methoxyphenyl)-serine is released.

The racemate can, for example, be separated by protecting the amino group of the racemic threo-3-(4-hydroxy-3-methoxyphenyl)-serine with a hydrogenolytically cleavable protecting group, for example, with an arylalkoxycarbonyl group, such as benzyloxycarbonyl, reacting the so-obtained derivative with an optically active base, for example, quinine, brucine or quinuclidine, and resolving the salt-mixture obtained into the optical antipodes by fractional crystallization.

The salt moiety of the (−) threo derivative isolated can, for example, be removed with the aid of alkali, and the protecting group can be removed in a catalytic manner.

According to a preferred embodiment, 3-(4-hydroxy-3-methoxyphenyl)-N-benzyloxycarbonyl-serine is reacted with quinine. The formed optically pure (−threo salt is separated, treated with aqueous alkali, and subjected to hydrogenolysis in the presence of palladium-charcoal.

The racemate can also be separated by protecting the carboxyl group of the racemic threo-3-(4-hydroxy-3-methoxyphenyl)-serine with a hydrolytically cleavable protecting group, for example, by esterifying with ethanol, reacting the so-obtained derivative with an optically active acid, for example, tartaric acid, quinic acid or diacetone-1-gulosonic acid, and resolving the salt-mixture obtained into the optical antipodes by fractional crystallization.

The salt moiety of the (−) threo derivative isolated can, as stated hereinbefore, be removed by treatment with alkali and the protecting group can be removed in an alkaline or acidic manner.

A preferred embodiment comprises reacting 3-(4-hydroxy-3-methoxyphenyl)-ethoxycarbonyl-serine with tartaric acid, separating the optically pure (−) threo salt, treating with aqueous alkali, and subsequently hydrolyzing with an aqueous alkali hydroxide or an aqueous mineral acid.

The (−) threo-3-(4-hydroxy-3-methoxyphenyl)-serine obtained has a melting point of 153°–154° C.; $[\alpha]_D^{24} = -32.5°$ (in N-hydrochloric acid, $c = 1$).

The racemic threo-3-(4-hydroxy-3-methoxyphenyl)-serine employed as the starting compound can be prepared, advantageously, by reacting vanillin benzyl ether with glycocoll in the presence of alkali and debenzylating the so-obtained 3-(4-benzyloxy-3-methoxyphenyl)-serine. The resulting 3-(4-hydroxy-3-methoxy-phenyl)-serine consists substantially of the desired threo form.

The aldehyde is conveniently reacted with the amino acid in the presence of aqueous/alcoholic alkali, for example, caustic alkali such as sodium or potassium hydroxide, preferably in a mixture comprising about half each of a lower alkanol such as methanol, ethanol, isopropanol or the like, and of an about 10 to 15 percent aqueous alkali hydroxide solution, at a temperature in the range of between about 20° and about 60° C.

The benzyl group can be removed in a known manner by hydrogenolysis. The hydrogenolysis is conveniently carried out with catalytically activated hydrogen in the presence of a lower alkanol such as methanol, ethanol, isopropanol or the like, and in the presence of a mineral acid such as hydrochloric acid, sulfuric acid or phosphoric acid. Noble-metal catalysts such as platinum oxide or palladium-charcoal are especially suitable as catalysts. Of the lower alkanols, methanol or ethanol are preferred. Of the mineral acids, hydrochloric acid is preferred.

Pure threo-3-(4-hydroxy-3-methoxyphenyl)-serine can be prepared by fractionally crystallizing the 3-(4-hydroxy-3-methoxyphenyl)-serine obtained or by converting 3-(4-benzyloxy-3-methoxyphenyl)-serine to an alkali salt, fractionally crystallizing it and debenzylating the separated threo compound.

The fractional crystallization of 3-(4-hydroxy-3-methoxyphenyl)-serine is preferably carried out in water.

The alkali salt of 3-(4-benzyloxy-3-methoxyphenyl)-serine, preferably the sodium salt of this compound, is conveniently subjected to fractional crystallization in a lower alkalol, for example, methanol, ethanol or the like.

The compound designated as threo-3-(4-hydroxy-3-methoxyphenyl)-serine, which first separates out in the fractional crystallization from water, has a melting point of 223°–225° C. The compound designated as erythro-3-(4-hydroxy-3-methoxy-phenyl)-serine which remains in the mother liquors and is obtainable by repeated concentration, has a melting point of 180°–182° C.

In the same manner, the sodium salt of, for example, 3-(4-benzyloxy-3-methoxyphenyl)-serine may also be separated into the compound designated as threo-3-(4-benzyloxy-3-methoxyphenyl)-serine sodium and into the compound designated as erythro-3-(4-benzyloxy-3-methoxyphenyl)-serine sodium by fractional crystallization from an alkanol, for example, methanol or the like.

The separated threo-3-(4-benzyloxy-3-methoxyphenyl)-serine sodium is advantageously dissolved in water and subsequently adjusted to the isoelectric point by addition of an organic or inorganic acid, for example, acetic acid or the like. The free acid can be debenzylated in an acidic medium as described above.

(−) Threo-3-(4-hydroxy-3-methoxyphenyl)-serine exhibits blood-pressure lowering properties, and is therefore useful as a hypotensive agent. The corresponding (+) compound, on the other hand, is practically inactive. The (−) threo-3-(4-hydroxy-3-methoxyphenyl)-serine exhibits a very low order of toxicity, for example, in mice, the lethal dosage ($LD_{50}$) on oral administration is more than 5,000 mg/kg. In rats, the blood-pressure lowering action can be demonstrated at a dosage of 3 mg/kg. p.o. On extended administration of 2 × 100 mg/kg. p.o. of (−) threo-3-(4-hydroxy-3-methoxyphenyl)-serine daily to hypertonic rats, a blood-pressure lowering of up to 21 mm Hg. was observed, and in dogs under the same experimental conditions an average blood-pressure lowering of 16 mm Hg. was observed.

The blood-pressure lowering effect of (−) threo-3-(4-hydroxy-3-methoxyphenyl)-serine is comparable with the activity of α-methyldopa, a known hypotensively active compound. (−) Threo-3-(4-hydroxy-3-methoxyphenyl)-serine can, accordingly, be employed as a hypotensive for combatting pathological high blood pressure, particularly as an agent against essential hypertension.

(−) Threo-3-(4-hydroxy-3-methoxyphenyl)-serine can accordingly be used as a medicament; for example, in the form of pharmaceutical preparations which contain it in admixture with a pharmaceutically inert organic or inorganic carrier suitable for enteral or parenteral application such as, for example, water, gelatin, gum arabic, lactose, starches, vegetable oils, polyalkyleneglycols and the like. The pharmaceutical preparations can be in solid form, for example, as tablets, dragees, suppositories or capsules, or in liquid form, for example, as solutions, suspensions or emulsions. Further, the preparations may be sterilized and/or can contain additives such as preserving, stabilizing, wetting or emulsifying agents, or salts for varying the osmotic pressure. They can also contain in combination other therapeutically valuable substances.

As used herein, the term "aryl" preferably denotes phenyl and the like. The term "alkoxy" preferably denotes a straight or branched chain lower alkyl ether group of one to seven carbon atoms, for example, methoxy, ethoxy, propoxy, pentoxy, and the like.

The following examples further illustrate the invention. All temperatures are in degrees centigrade, unless otherwise mentioned.

EXAMPLE 1

Preparation of threo-3-(4-hydroxy-3-methoxyphenyl)-serine and (−) threo-3-(4-hydroxy-3-methoxy-phenyl)-serine 164 g. of benzyloxycarbonyl chloride are added dropwise at 5°–10° C. over a period of 20 minutes to a solution containing 180 g. of threo-3-(4-hydroxy-3-methoxyphenyl)-serine and 64 g. of sodium hydroxide in 2,50 ml. of water. The pH value of the reaction mixture is maintained at 9.5–10 by the occasional addition of caustic soda. The alkaline solution is allowed to stand at 5°–10° C. for 4 hours and is subsequently shaken with two 2,000 ml. portions of ether. The aqueous phase is separated, acidified (pH 2–3) with hydrochloric acid and extracted with ethyl acetate. The extract is washed with water, dried over sodium sulfate and concentrated to about 150 ml. under reduced pressure. The concentrate is dissolved in 200 ml. of hexane. After standing in the cold for 12 hours, 3-(4-hydroxy-3-methoxyphenyl)-N-benzyloxycarbonyl-serine (141 g.) crystallizes out and has a melting point of 148°–149° C.

275 g. of 3-(4-hydroxy-3-methoxyphenyl)-N-benzyloxycarbonyl-serine are dissolved in a solution containing 300 g. of quinine trihydrate in 7,350 ml. of ethanol and 735 ml. of water at 60° C. The solution is allowed to stand at room temperature for 200 hours. The crystal formation should neither be initiated by scratching nor accelerated by cooling. The optically pure quinine salt (170 g.) obtained in this manner melts at 141°–142° C.; $[\alpha]_D^{24} = -92°$ (in ethanol, $c=1$).

The quinine salt obtained (170 g.) is suspended in 600 ml. of ethyl acetate and, after the addition of 600 ml. of 1.5N hydrochloric acid, is shaken until two clear layers form. The ethyl acetate phase is separated, dried over sodium sulfate and evaporated under reduced pressure. The residual oily (−) threo-3-(4-hydroxy-3-methoxyphenyl)-N-benzyloxycarbonyl-serine (82 g.) melts at 145°–146° C. after recrystallization from chloroform; $[\alpha]_D^{24} = -22.2°$ (in ethanol, $c=1$).

198 g. of (−) threo-3-(4-hydroxy-3-methoxyphenyl)-N-benzyloxycarbonyl-serine are dissolved in a mixture consisting of 2,000 ml. of methanol, 1,000 ml. of water and 200 ml. of 3N hydrochloric acid and, after the addition of 5 g. of 10 percent palladium-charcoal, hydrogenated at room temperature and 20–30 atmospheres. The hydrogenation ceases after uptake of about 12.3 l. of hydrogen. The catalyst is removed by filtration. The filtrate is concentrated to about 800 ml. under reduced pressure and adjusted to a pH value of 6 by the addition of diethylamine/methanol (1:1). After standing in the cold for 12 hours, (−) threo-3-(4-hydroxy-3-methoxyphenyl)-serine (128 g.) crystallizes out and is removed by filtration and washed with a little water, ethanol and ether. The compound melts at 153°–154° C. (dec.); $[\alpha]_D^{26} = -32.5°$ (in N-hydrochloric acid, $c=1$).

The starting material threo-3-(4-hydroxy-3-methoxyphenyl)-serine can be prepared as follows:

322 g. of vanillin benzyl ether are dissolved in 2,000 ml. of ethanol and 800 ml. of water at 50°–60° C. and treated with a solution containing 50 g. of glycocoll and 68 g. of sodium hydroxide in 200 ml. of water. The reaction mixture is heated at 40°–50° C. and after standing for 1 hour is evaporated under reduced pressure. The residual syrup is digested with a mixture consisting of 1000 ml. of water and 1,200 ml. of 3N hydrochloric acid, heated to 40°–50° C. and after standing for 1 hour, cooled. The unreacted vanillin benzyl ether is taken up in methylene chloride and separated. After evaporating off the solvent, the vanillin benzyl ether can be purified by distillation in high vacuum and again used for further batches.

To remove the last traces of methylene chloride, the aqueous acidic solution is briefly heated under reduced pressure and subsequently neutralized (pH = 5–6) by the cautious addition of conc. caustic soda. The crude amino acid which precipitates is removed by filtration, repeatedly washed with water, dissolved in a mixture consisting of 55 ml. of conc. hydrochloric acid and 1500 ml. of water, and purified by shaking with animal charcoal. The filtrate is made neutral (pH=5–6) by the addition of diethylamine. After standing in the cold for 24 hours, 3-(4-benzyloxy-3-methoxyphenyl)-serine crystallizes out and is washed with water, ethanol and ether, and dried at 50° C. under vacuum. The compound melts at 180°–185° C.

260 g. of 3-(4-benzyloxy-3-methoxyphenyl)-serine are dissolved in 1,950 ml. of methanol, 1,300 ml. of water and 115 ml. of concentrated hydrochloric acid, treated with 20 g. of 5 percent palladium-charcoal and hydrogenated under normal conditions. The hydrogenation ceases after uptake of 21 l. of hydrogen. The solution, smelling strongly of toluene, is separated from the catalyst, concentrated to 300–400 ml. under reduced pressure, and subsequently neutralized (pH= 5–6) by addition of diethylamine. After standing in the cold for 12 hours, 3-(4-hydroxy-3-methoxyphenyl)-serine crystallizes out and is washed with water, ethanol, ether and petroleum ether and dried in vacuum. The so-obtained 3-(4-hydroxy-3-methoxyphenyl)-serine consisting of the threo form to the extent of about 80 percent and of the erythro form to the extent of about 20 percent, and melts at 205° C.

Pure threo-3-(4-hydroxy-3-methoxyphenyl)-serine can be prepared, by first fractionally crystallizing the 3-(4-hydroxy-3-methoxyphenyl)-serine, as hereinafter described.

100 g. of 3-(4-hydroxy-3-methoxyphenyl)-serine are dissolved in 8,000 ml. of boiling water and filtered over decolorizing charcoal. The pure threo-3-(4-hydroxy-3-methoxyphenyl)-serine which separates as a crystalline material at room temperature after 2 to 3 days, melts at 223°–225° C. The mother liquor is concentrated at 2,000 ml. under reduced pressure. The mixture consisting of the threo and erythro form which precipitates is separated. The filtrate is again concentrated to a volume of 500 to 600 ml. and cooled to 0°–5° C. The pure erythro-3-(4-hydroxy-3-methoxyphenyl)-serine which crystallizes out melts at 180°–182° C.

Pure threo-3-(4-hydroxy-3-methoxyphenyl)-serine can further be obtained by the fractional crystallization of an alkali salt of 3-(4-benzyloxy-3-methoxphenyl)-serine and followed by debenzylation.

63 g. of 3-(4-benzyloxy-3-methoxyphenyl)-serine are introduced to a solution containing 11 g. of sodium methylate in 1,000 ml. of methanol. The sodium salt of threo-(4-benzyloxy-3-methoxyphenyl)-serine which separates as a crystalline material from the solution after 5 to 10 minutes is isolated after longer standing in the cold, washed with methanol and subsequently dissolved in water. The solution is made neutral (pH = 5–6) by addition of acetic acid.

The free amino acid which precipitates is converted by hydrogenolysis as described hereinbefore into pure threo-3-(4-hydroxy-3-methoxyphenyl)-serine which melts at 223°–225° C.

The mother liquors of the sodium salt are concentration stepwise. The intermediate fraction which precipitates, consisting of a mixture of the threo and erythro form of the sodium salt, is separated. The filtrate is again evaporated almost to dryness. The residual sodium salt of erythro-3-(4-benzyloxy-3-methoxyphenyl)-serine, which is very readily soluble in methanol, is precipitated by addition of ether. The compound can be converted into the free amino acid as described above and debenzylated to pure erythro-3-(4-hydroxy-3-methoxyphenyl)-serine according to the procedure hereinbefore set forth.

EXAMPLE 2

Tablets can be prepared as follows:

| | |
|---|---|
| (—) Threo-3-(4-hydroxy-3-methoxyphenyl)-serine | 200 g. |
| Lactose | 200 g. |
| Corn starch | 170 g. |
| Ethylcellulose | 20 g. |
| Talcum | 9 g. |
| Magnesium stearate | 1 g. |

The active substance is mixed with the lactose and 120 g. of the corn starch and granulated with a solution of the ethyl-cellulose in 40 ml. of methylene chloride. The granulate is dried at room temperature, mixed with the remaining 50 g. of corn starch and, after addition of the stated amounts of talcum and magnesium stearate, pressed to tablets.

| | |
|---|---|
| Individual weight of one tablet | 600 mg. |
| Active substance content of one tablet | 200 mg. |

EXAMPLE 3

Capsules can be prepared as follows:

| | |
|---|---|
| (—) Threo-3-(4-hydroxy-3-methoxyphenyl)-serine | 200 g. |
| Mannitol | 100 g. |
| Talc | 18 g. |
| Magnesium stearate | 2 g. |

The ingredients are homogeneously mixed and filled into interlocking capsules via a capsule filling machine.

| | |
|---|---|
| Individual weight of the contents of one capsule | 320 mg. |
| Active substance content of one capsule | 200 mg. |

We claim:
1. The laevorotatory form of threo-3-(4-hydroxy-3-methoxyphenyl)-serine substantially free from its optical antipode.

* * * * *

UNITED STATES PATENT OFFICE
CERTIFICATE OF CORRECTION

Patent No. 3,723,514          Dated March 27, 1973

Inventor(s) Balthasar Hegedus and Paul Zeller

It is certified that error appears in the above-identified patent and that said Letters Patent are hereby corrected as shown below:

Cover page, before " [22] Filed: Jan. 15, 1970" insert:

[73] Assignee: Hoffmann-La Roche Inc., Nutley, New Jersey

Signed and sealed this 16th day of July 1974.

(SEAL)
Attest:

McCOY M. GIBSON, JR.          C. MARSHALL DANN
Attesting Officer             Commissioner of Patents